(12) United States Patent
Diaconescu et al.

(10) Patent No.: US 7,046,699 B2
(45) Date of Patent: **\*May 16, 2006**

(54) POINTER PROCESSING AND PATH BIP-8 COMPUTATION FOR LARGE CONCATENATED PAYLOADS

(75) Inventors: Luca R. Diaconescu, Ottawa (CA); Ronald J. Gagnon, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 147 days.

This patent is subject to a terminal disclaimer.

(21) Appl. No.: 10/787,200

(22) Filed: Feb. 27, 2004

(65) Prior Publication Data

US 2004/0187128 A1    Sep. 23, 2004

Related U.S. Application Data

(62) Division of application No. 09/663,823, filed on Sep. 15, 2000, now Pat. No. 6,738,395.

(51) Int. Cl.
*H04J 3/00* (2006.01)
*H04J 3/04* (2006.01)

(52) U.S. Cl. ...................................... 370/517; 370/535
(58) Field of Classification Search ................ 370/517, 370/535, 506, 516–519, 907, 503, 515
See application file for complete search history.

(56) References Cited

U.S. PATENT DOCUMENTS

| | | | | |
|---|---|---|---|---|
| 5,113,395 A | * | 5/1992 | Murakami et al. | 370/505 |
| 5,142,529 A | * | 8/1992 | Parruck et al. | 370/545 |
| 5,172,376 A | * | 12/1992 | Chopping et al. | 370/509 |
| 5,331,630 A | * | 7/1994 | Fujita et al. | 370/351 |
| 5,461,622 A | * | 10/1995 | Bleickardt et al. | 370/470 |
| 5,471,476 A | * | 11/1995 | Hiramoto | 370/516 |
| 5,535,219 A | * | 7/1996 | Freitas | 370/509 |
| 5,696,788 A | * | 12/1997 | Choi et al. | 714/736 |
| 5,751,720 A | * | 5/1998 | Uematsu et al. | 370/503 |
| 5,796,796 A | * | 8/1998 | Wang | 375/372 |
| 5,809,032 A | * | 9/1998 | Weeber et al. | 370/517 |
| 6,339,628 B1 | * | 1/2002 | Yoshida | 375/376 |
| 6,400,785 B1 | * | 6/2002 | Sunaga et al. | 375/372 |

* cited by examiner

*Primary Examiner*—Andy Lee
(74) *Attorney, Agent, or Firm*—Jeffrey M. Measures; Borden Ladner Gervais LLP

(57) ABSTRACT

A system for performing Bit Interleaved Parity-8 (BIP-8) computation on large concatenated payloads, in a processing node of an optical communications networks. The BIP-8 computation system comprises storage means associated with each processing strip for allowing the comparison between calculated and transmitted frame error check values to be delayed.

8 Claims, 6 Drawing Sheets

US 7,046,699 B2

POINTER PROCESSING AND PATH BIP-8 COMPUTATION FOR LARGE CONCATENATED PAYLOADS

CROSS REFERENCE TO RELATED APPLICATIONS

This is a divisional of application Ser. No. 09/663,823, filed Sep. 15, 2000, now U.S. Pat. No. 6,738,395.

MICROFICHE APPENDIX

Not applicable.

TECHNICAL FIELD

The present invention relates to optical communication networks, and in particular to performing pointer processing and path BIP-8 computation for large concatenated payloads within processing nodes of such a network.

BACKGROUND OF THE INVENTION

Processing network nodes in current optical networks employing CMOS technology are limited by the speeds of this technology, which are well below currently available speeds of transmitting data over fibre optic links in such networks. In addition, at a network processing node, data may come from several different sources, on different connections and at different line clocks. However, at the node, all data must be processed at a local system clock. Accordingly, pointer processor systems are used within processing network nodes to perform timing adjustments on incoming data, by converting the incoming data from a line clock domain to a local system clock domain or 'shelf-time' domain.

In order to be able to handle large data frames, pointer processors usually comprise several integrated circuits. In turn, each integrated circuit may comprise a plurality of processing strips, with each processing strip having a limited data processing capacity. A known pointer processor design for SONET (Synchronous Optical Network) or SDH (Synchronous Digital Hierarchy) type data frames is structured on STS (Synchronous Transmission Signal)-n level pointer processing strips, which are capable of processing the equivalent of n STS-1 building blocks from a SONET/SDH frame.

It is often desirable to be able to carry frames comprising large payloads, such as concatenated STS-Nc frames across pointer processing nodes. This implies that for N greater than n, concatenated payloads must be carried across several STS-n level pointer processing strips and possibly even across several chips, when the number of STS-n level pointer processing strips on a single chip is insufficient for the STS-Nc, when N is a large number.

A SONET/SDH STS-Nc concatenated frame is built from N STS-1 building blocks pasted together, but information about the beginning of the SPE is kept only in the pointer bytes, H1 and H2, of the leading STS-1 block in the concatenation. In other words, only the leading STS-1 block in a concatenation comprises valid pointer information within its H1 and H2 bytes, whereas the H1 and H2 bytes of the trailing STS-1 blocks of the concatenation contain only a concatenation indication. On the other hand, in processing a SONET/SDH frame on a pointer processing strip, the strip must have valid pointer information for all the STS-1 blocks within the processed frame. It follows that in processing a concatenated payload across several pointer processing strips, strips processing trailing STS-1 blocks in the concatenation must obtain the valid pointer information from the strip processing the leading STS-I block in the concatenation.

FIG. 1 illustrates a general scheme of passing pointer information through a pointer processing strip or SYNC block, such that it can operate properly on SONET/SDH type data frames. The pointer processing strip has a pointer interpreter side and a pointer generator side. The pointer interpreter side, working in the line clock domain, receives the incoming data frames on the 'Data-in' line, interprets their overhead and writes (W) the payload in an Elastic Store. The pointer generator side, working in the system or shelf clock domain, reads (R) the payload from the Elastic Store and forms new SONET/SDH or other type frames to be passed further to the processing node on the 'Data-out' line. The generation of frames by the pointer generator side is based on a SYNC 8K signal, which is an 8 kHz reference indicating the phase of the frame to be formed. The writing and reading of the payload to and from the elastic store, respectively, must be done based on corresponding valid pointer information. In addition, due to the format of the SONET and SDH type frames, valid pointer information on either side of the pointer processor must be available before the reading of the H3 overhead byte, on the pointer interpreter side, or the generation of the H3 byte on the pointer generator side. This is due to the fact that the H3 byte, which follows the H1/H2 pointer bytes in the line overhead of the SONET/SDH standard, may, in the event of a negative pointer adjustment, be part of the actual SPE payload. Let A and B be ports of inputting pointer information to the pointer interpreter and the pointer generator sides, respectively, from a previous pointer processing strip, for example. Also, let A' and B' be corresponding ports of outputting pointer information. Considering the pointer processing of a certain frame, let $t_1$ be a moment in time when the H3 byte is read from the incoming data and $t_2$ be a subsequent moment in time when the H3 byte is added to the generated frame, according to the SYNC 8K signal. According to the above, it follows that for the pointer processing strip to function properly, valid pointer information must be available at A before $t_1$ and at B before $t_2$. Furthermore, if this condition is met and letting $\Delta t$ be the propagation delay of pointer information through the pointer processing strip, valid pointer information will be outputted at A' on or before $t_1+\Delta t$, and at B' on or before $t_2+\Delta t$.

FIG. 2 illustrates a known scheme of passing pointer information along a sequence of pointer processing strips or SYNC blocks #1, #2, #3, etc. Data come in simultaneously at all blocks on their pointer interpreter sides, through 'Data-in' lines. Likewise, data is generated on the 'Data-out' lines based on the same SYNC 8K signal running to all three blocks. Assuming that SYNC block #1 receives valid pointer information through A and B at $t_1$ and t2, respectively, then SYNC block #2 receives the valid pointer information from SYNC block #1, at $t_1+\Delta t$ and $t_2+\Delta t$, respectively, SYNC block #3 receives the valid pointer information at $t_1+2\Delta t$ and $t_2+2\Delta t$, respectively, and so on. In order for the SYNC blocks to operate properly, the incoming H3 bytes must be read as follows: on or after $t_1$ on SYNC block #1, on or after $t_1+\Delta t$ on SYNC block #2, on or after $t_1+2\Delta t$ on SYNC block #3, and so on. Similar conditions apply to the outgoing H3 bytes in the generated frames. It follows that in this design, only a limited number of pointer processing strips can be used to perform pointer processing on a concatenated payload. Specifically, the number of strips that can be used is approximately equal to T/Δt, where T is the length of the critical time region during which the pointer information must be propagated. Specifically, this critical time region is defined by the time period between the moment when all the necessary pointer information on the strip is available, such as after the H1/H2 bytes of the last STS-1 leader on the strip has been read, and the moment when all the pointer information must be available on the next strip, which is the moment of processing the H3 byte of the first STS-1 block processed on that strip. In the SONET standard T is approximately 100 nanoseconds(ns). Δt is dependent on the technology and is currently of the order of several ns, depending on the capacity of the SYNC blocks. For example, one of the technologies currently owned by the assignee of this application, features a 25 ns pointer information propagation delay between STS-48 level processing strips. This implies that a concatenated payload cannot be carried across more than 4 such strips, limiting the size of the concatenation frame to an STS-192c.

In addition to the need for conveying pointer information downward from one SYNC block to the next, along a string of SYNC blocks spanning a concatenated payload, information must also be conveyed in an upward fashion. For example, when the pointer state of an STS-1 block within the concatenation is 'AIS'(alarm indication signal), instead of 'V', for valid pointer or 'C' for concatenation indicator, such information is transmitted to preceding STS-1 blocks. From the information that travels upward across slices as indicated by the arrows U, especially important are frame error check values such as the B3 byte data, of which computation is commonly performed within the pointer processors. In the SONET standard, B3 is a path Bit Interleaved Parity-8 (BIP-8) byte. The value of a B3 byte in a given frame is calculated by XOR-ing the SPE bytes of the given frame starting with the J1 byte. The calculated B3 value for the given frame must be checked against a transmitted B3 value for the given frame, which is located within the frame following the given frame in the transmission.

For a concatenated frame, the B3 value for the entire frame is kept in the B3 byte position of the leading STS-1 block in the concatenation and it is also calculated through an XOR operation over all SPE bytes in the frame. This calculation can be accomplished by XOR-ing the B3 values of all the STS-1 blocks in the concatenation. Accordingly, when a concatenation is split across several pointer processing strips, the B3 byte data must be sent upwards from strip to strip, until the strip containing the leading STS-1 block of the concatenation is reached.

SUMMARY OF THE INVENTION

It is an object of the invention to provide a novel pointer processing system and method for carrying large concatenated payloads across a processing node of an optical communications networks.

It is another object of the invention to provide a novel system and method for BIP-8 computation for large concatenated payloads within a processing node of an optical communication network.

According to one aspect of the invention, there is provided a pointer processor system comprising: an input port for receiving input data, a parallel array of pointer processing strips, for adjusting line clock domain input data to system clock domain output data, means for distributing input data from the input port to the pointer processing strips according to a distribution order, a pointer interpreter delay block controlling input data reading on at least a pair of an $i^{th}$ and $j^{th}$ pointer processing strips, such that corresponding input data is read on the $j^{th}$ pointer processing strip after a predetermined pointer interpreter pair delay from a time moment when corresponding input data is read on the $i^{th}$ pointer processing strip, wherein i and j are integers assigned to the pointer processing strips according to the distribution order and j is greater than i, means for collecting output data from the pointer-processing strips according to a collection order, and an output port for transmitting output data.

According to another aspect of the invention, in a digital optical network, a method of performing pointer processing on a concatenated payload is provided. The method comprises the steps of distributing the concatenated payload into a plurality of data slices according to a distribution order and performing pointer processing operations on at least a pair of an $i^{th}$ and $j^{th}$ data slices. The pointer processing step is performed such that pointer processing of a fixed byte within the $j^{th}$ data slice is performed after a predetermined pair delay from the pointer processing of a corresponding fixed point in the $i^{th}$ data slice, wherein i and j are integers assigned to the pointer processing strips according to the distribution order and j is greater than i.

According to a further aspect of the invention, there is provided a Bit Interleaved Parity-8 (BIP-8) computation system. The BIP-8 computation system comprises a frame error check value computation block receiving first frame data from a frame processor, for computing new first frame BIP-8 values, storage means receiving second frame data from the frame processor for storing old first frame BIP-8 values, wherein the old first frame BIP-8 value is transmitted within the second frame, a comparator circuit receiving data from the BIP-8 computation block, from the storage means and from a critical time signalling circuit, for comparing the new first frame BIP-8 values with the old first frame BIP-8 values. The critical time signalling circuit sends an enabling signal to the comparator, for enabling the comparison operation according to a predetermined comparison timing schedule.

According to yet a further aspect of the invention there is provided a method of computing a local frame error check values for a data slice of a transmission frames processed at nodes of a digital optical network. The method comprises computing a calculated local frame error check value based on frame values received within a first transmission frame, storing a transmitted local frame error check values received within a second transmission frame; and comparing the calculated local frame error check value and the transmitted local frame error check value upon the reception of a comparison signal.

According to yet a further aspect of the invention, there is provided a pointer processor system for performing pointer processing on a large concatenated payload across multiple integrated circuits. The pointer processor system comprises a first integrated circuit, a second integrated circuit having a common chip boundary with the first integrated circuit an array of pointer processing strips for performing pointer processing functions, wherein the pointer processing strips are distributed on the first and second integrated circuits, a first inter-chip communication block located on the first integrated circuit near the common chip boundary and a second inter-chip communication block located on the second integrated circuit near the common chip boundary, for collecting information from pointer processing strips located on the first integrated circuit to pointer processing strips located on the second integrated circuit across the common chip boundary.

According to yet a further aspect of the invention there is provided a method of performing pointer processing on a concatenated payload across multiple integrated circuits, within a digital optical network. The method comprises distributing the concatenated payload into a string of data slices according to a distribution order, determining an across-chip pair of data slices within said string, wherein the across-chip pair comprises data slices requiring pointer processing on separate integrated circuits and transmitting pointer information from a first data slice in the across-chip pair to a second data slice in the across-chip pair. The transmission of the pointer information includes dividing the pointer information into a non-critical set and a critical set, transmitting the non-critical set of pointer information away from a critical region, serially and transmitting the critical set of pointer information within the critical region, asynchronously.

Among the advantages presented by the pointer processing method and system of the preferred embodiments of the invention is the ability to perform pointer processing and BIP-8 computation on very large concatenated payloads. Other advantages, objects, and features of the present invention will be readily apparent to those skilled in the art from a review of the following detailed description of preferred embodiments in conjunction with the accompanying drawings and claims.

BRIEF DESCRIPTION OF THE DRAWINGS

The present invention will now be explained, by way of example only, with reference to certain embodiments and the attached Figures in which.

Similar references are used in different drawings to denote similar components.

DETAILED DESCRIPTION OF THE PREFERRED EMBODIMENTS OF THE INVENTION

Figure 3:
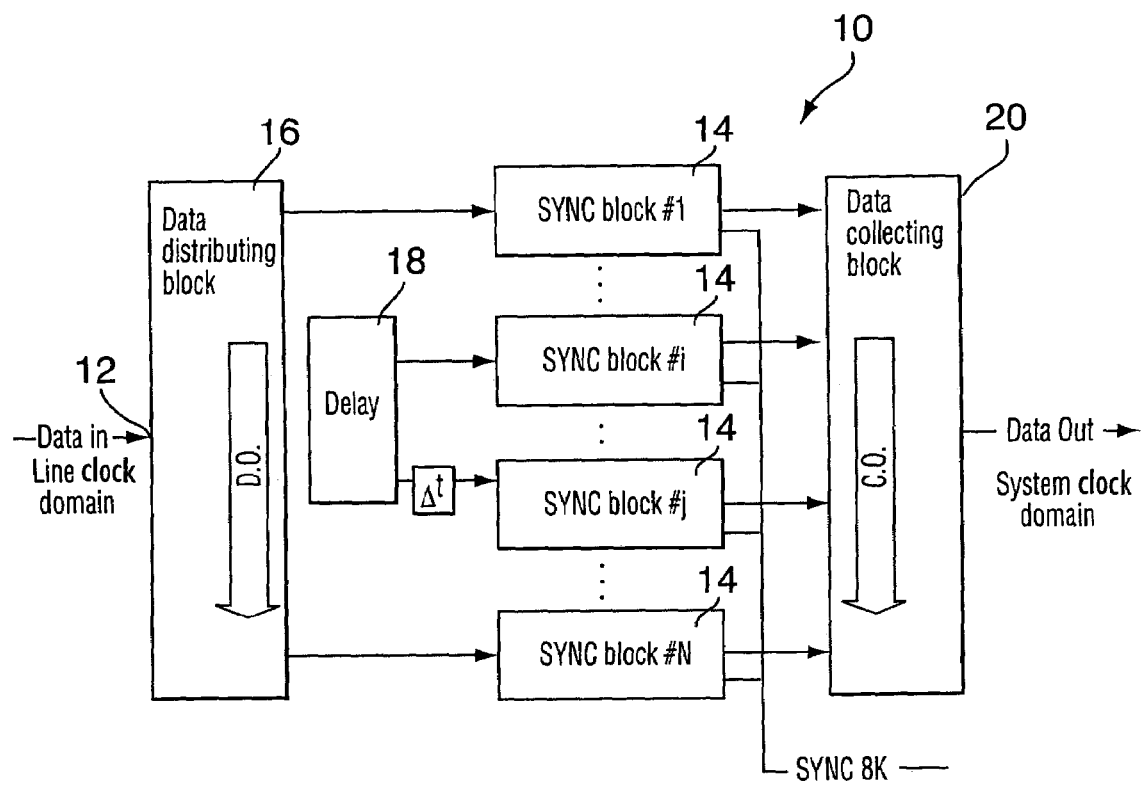
FIG. 3 illustrates a block diagram of a pointer processing system according to an aspect of a first embodiment of the invention.

FIG. 3 illustrates a block diagram of a pointer processor machine 10 according to an embodiment of a first aspect of the present invention. The pointer processor machine 10 comprises an input port 12, a parallel array of N pointer processing strips or SYNC blocks 14, means for distributing input data 16, a delay block 18, means for collecting output data 20 and an output ports 22.

The input port 12 receives input data in a line clock domain. The input data is distributed to the parallel array of pointer processing strips 14 by the means for distributing data 16, according to a distribution order (DO), such as the standard SONET/SDH transmission order for SONET/SDH frames. Given the distribution order, the pointer processing strips 14 can be numbered from 1 to N, where the $1^{st}$ strip receives the leading segments or data slices of a data frame and the Nth strip receives the end data slices of a data frame. The means for distributing data or distribution block 16 comprises a Time Slot Interchange (TSI) block which arranges the STS-1 block in the frames arriving at the pointer processor system 10 in the format required at the pointer processing strips 14.

Figure 1:
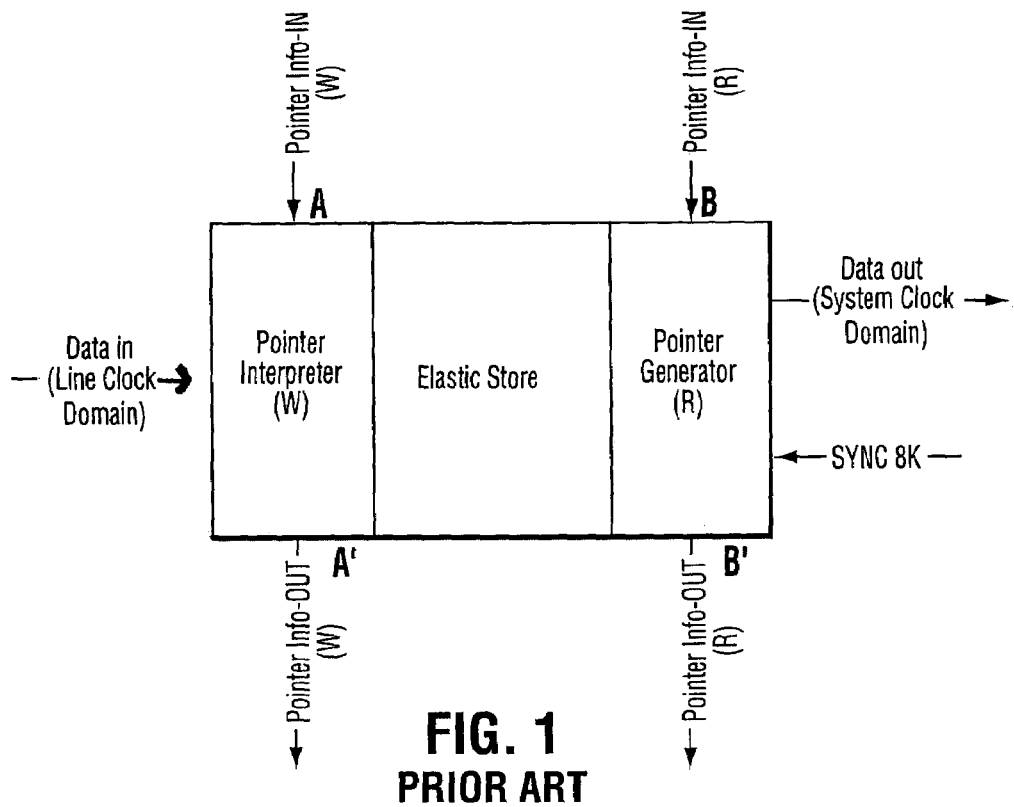
FIG. 1 illustrates a block diagram of a general pointer processing strip.
Figure 2:
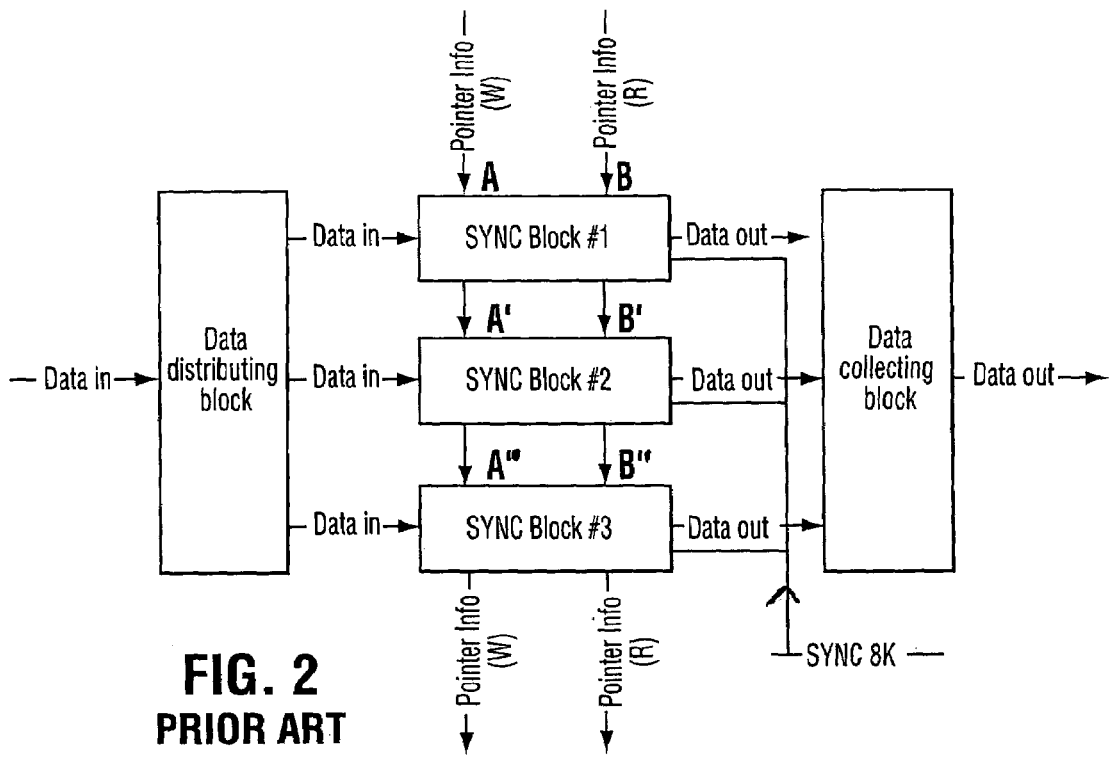
FIG. 2 illustrates a block diagram of a known pointer processing system comprising several pointer processing strips.

The parallel array of pointer processing strips 14 adjust input data in a line clock domain to output data in a system clock domain. Each pointer processing strip 14 in FIG. 3 is similar to the one shown in FIG. 1, comprising a Pointer Interpreter, an Elastic Store and a Pointer Generator in order to perform the pointer processing function. The pointer processing strips 14 may be STS-12, STS-24, or STS-48 level pointer processing strips or the like. In the case where incoming data comprises large concatenated SONET/SDH frames, these are distributed across several SYNC blocks and pointer information is transmitted along the sequence of these blocks, from one to the next.

The data adjusted from the line clock domain to the system or shelf clock domain by the pointer processing strips 14, is collected by the means for collecting data 20 according to a collection order (CO), which is usually the same as the distribution order (DO), since usually the objective is to have the payload run smoothly through the pointer processor. The collection of data from the pointer processing strips 14 and generation of a new SONET, SDH or other type of frame, carrying the same payload as the incoming frame, but being adjusted to the shelf side clock, is governed by a SYSTEM 8K signal. The means for collecting data 20 usually comprise a TSI block performing a mirror image operation to the TSI block operation within the means for distributing data 16.

The data at the system clock domain, collected from the pointer processing strips 14 by the means for collecting data 20 is output through the output port 22 and transmitted to the system processing node for further processing.

According to an aspect of the present invention, the delay block 18 controls data processing on least two pointer processing strips 14, say the $i^{th}$ and the $j^{th}$ blocks, where j is greater than i. The delay block 18 ensures that data processing on the second processing strip is delayed from data processing on the first processing strip by a predetermined pointer pair delay, $\Delta t$. In the embodiment in FIG. 3, the delay block 18 is shown as controlling data on the pointer interpreter side of the SYNC blocks 14. In this case, the pair delay may be more specifically referred to as a pointer interpreter pair delay. However, the delay block 18 could similarly control data only on the pointer generator side of the SYNC blocks 14, by introducing pointer generator pair delays. In the preferred embodiment described in detail later on, delay blocks control data processing in both the pointer interpreter and pointer generator sides of the SYNC blocks 14.

Figure 4:
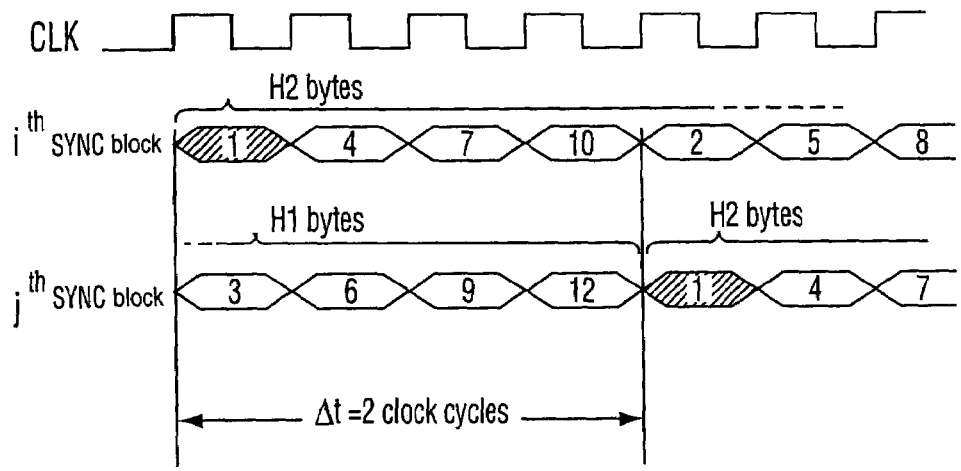
FIG. 4 illustrates the delay in the processing on two pointer processing strips such as in FIG. 3.

FIG. 4 illustrates the delay in processing data slices on the $i^{th}$ and $j^{th}$ strips, relative to a corresponding clock signal CLK. The clock signal may represent either the line clock or the shelf clock, depending on which side of the elastic store the delay is implemented. Since data slices processed on the $i^{th}$ and $j^{th}$ strips have fixed formats, the predetermined pair delay $\Delta t$ is illustrated as a delay in processing a corresponding fixed points, such as the H2 bytes, on each strip. In addition, since the operation is digital, the predetermined pair delay $\Delta t$ is measured in time slots or clock cycles of the clock signal CLK. In the embodiment illustrated in FIG. 4, the predetermined pair delay $\Delta t$ is set at 2 clock cycles.

The delay block 18 is preferably implemented as a software programmable delay. In addition, the delay block 18 could be implemented as a single hardware entity, or within the means for distributing data 16, or within the pointer processing strips 14, as a First In First Out (FIFO) register, for example. A specific embodiment found preferable the point of view of hardware overhead, contemplates implements the delay block function within a framer circuit (not shown), which also incorporates the means for distributing data 16 to the pointer processing strips 14, involves less hardware overhead.

Figure 5:
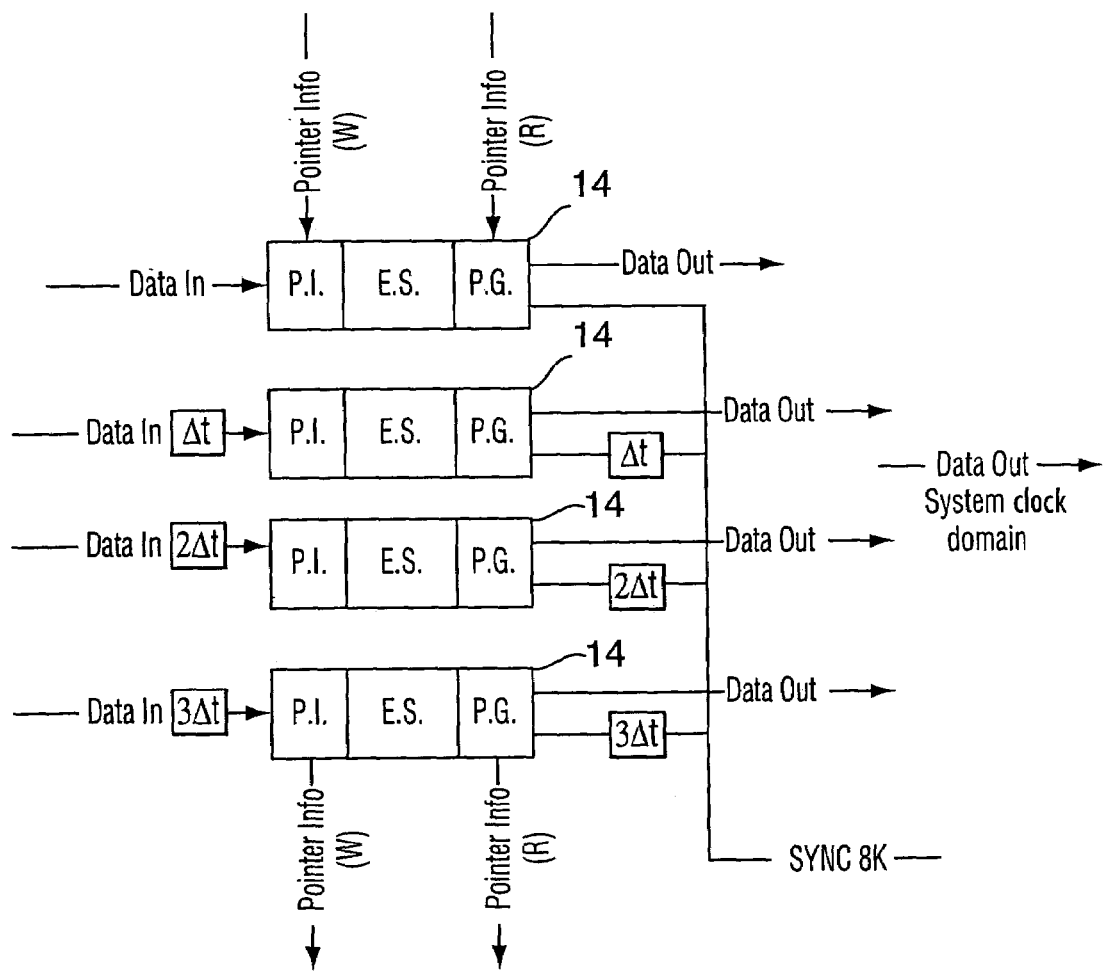
FIG. 5 illustrates a block diagram of a pointer processing system according to a further embodiment of the present invention.

FIG. 5 illustrates an array of parallel pointer processing strips 14 on a pointer processing machine 10 such as in FIG. 3, operating according to a preferred embodiment of the invention. In the embodiment illustrated in FIG. 5, a delay block 18' controls all data entering the pointer processing strips 14 on the pointer interpreter (PI) or elastic store (ES) writing (W) sides. Moreover, a similar delay block 18" controls all data exiting the pointer processing strips 14 on the pointer generator (PG) or elastic store reading (R) sides, in a similar fashion. According to the preferred embodiment, any two adjacent pointer processing strips 14 feature relative pair delays $\Delta t$ on both the input and output lines, with the first of the two processing strips 14 in the adjacent pair processing earlier. A staggering effect of the array of pointer processing strips 14 is achieved. The delays on the pointer generator (PG) sides are achieved by delaying the SYNC 8K based signals running to each strip.

Furthermore, according to the preferred embodiment, the pair delay $\Delta t$ between any two adjacent pointer processing strips 14 is approximately equal to the pointer information propagation delay between two such adjacent pointer processing strips 14, when they are located on the same integrated circuit. This arrangement overcomes the limitation of the system described in the background section, in which a restricted number of parallel pointer processing strips 14 could be used in carrying a concatenated frame, where the restriction was caused by the accumulation of propagation delays in passing pointer information downward, from strip to strip. In fact, with respect to the downward pointer information propagation, the system illustrated in FIG. 5 poses no restriction. In theory, an infinite number of pointer processing strips 14 could be used in carrying a concatenated payload, as long as the strips 14 are on the same integrated circuit. However, in practice, an integrated circuit may include only a limited number of pointer processing strips 14, and solutions to problems associated with the need to cross chip boundaries will be described later. In addition, as mentioned in the background section, in carrying a concatenated payload across parallel pointer processing strips 14, communication among pointer processing strips spanning the concatenation also takes place in a upward fashion. Solutions to problems associated with this type of communication, are also described below. Nonetheless, the system described in connection with FIG. 5, advantageously allows very large concatenated payloads to be carried across a pointer processor.

For example, a current technology owned by the assignee of the present invention, employs pointer processor machine comprising Application Specific Integrated Circuits (ASIC's) that include eight STS-48 level pointer processing strips, featuring a pointer information propagation delay from strip to strip of 25 ns. Therefore, employing the preferred embodiment previously described in reference to FIG. 5 with $\Delta t=25$, concatenated payloads could be easily carried on as much as 8 such pointer processing strips. This is equivalent to an STS-384c, which is double in size to the STS-192c supported by the system described in the background section.

Path BIP-8 Computation for Large Concatenated Payloads

Figure 6:
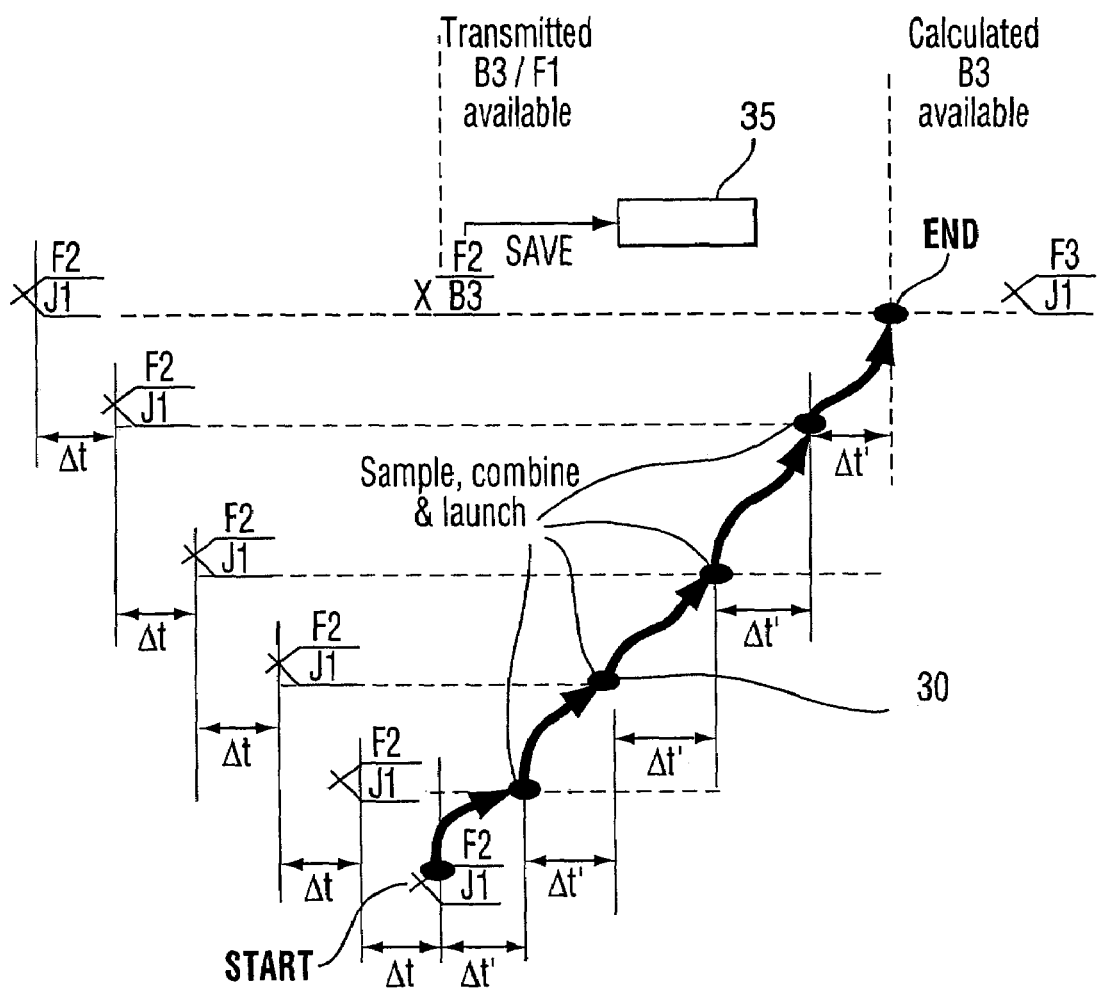
FIG. 6 illustrates a timing diagram for a B3 computation system according to another embodiment of the present invention.

FIG. 6 illustrates, by way of example, a timing diagram in connection with a method of performing the B3 calculation and error detection across a system of six STS-48 level pointer processing strips, located all on the same ASIC and arranged according to the embodiment illustrated in FIG. 5. The timing diagram illustrated may equally well describe the process on the Elastic Store Write sides of the strips, or on the Elastic Store Read side of the strips. The pointer processing strips are staggered with a pair delay $\Delta t$, such as in FIG. 5. Assume that a concatenated payload is carried across all six strips, with the first strip spanning the concatenation being strip #1. The B3 calculation for the concatenated payload comprises calculating local B3 values for each strip, starting on the last strip, and propagating these values upwards on the array, along the B3 propagation path, up to the first strip.

Usually, the local B3 value on a strip is calculated continuously, by XOR-ing all SPE bytes read on the strip. The J1 byte marks the beginning of the SPE bytes for a new frame, hence the local B3 calculation corresponding to a first frame F1 is correct, i.e. takes into account all SPE bytes for F1 read on that strip, just before the arrival of the J1 byte for the next frame, F2.

Accordingly, the J1 byte for F2, on the last strip spanning the concatenation, i.e. strip #6 in this case, marks the beginning of the B3 propagation path, for F1. The shape of the B3 propagation path is given by the staggering of the strips with $\Delta t$ and by the B3 upward propagation delay $\Delta t'$ from strip to strip. On arriving at each strip, the B3 value received from below along the B3 propagation path is sampled, combined with the B3 value for the local strip into a new B3 value to be launched further along the B3 propagation path. This process ends with a new calculated B3 value on the first strip spanning the concatenation. This B3 value is the B3 calculated value for the entire F1.

For detecting frame errors, a B3 value for F1 transmitted within F2, must be compared with newly calculated B3 for F1. However, the B3 for F1 calculation performed as above may not finished at the time of extracting the transmitted B3 for F1 from the corresponding F2 data read on strip #1. To overcome this timing problem, the transmitted B3 extracted from F2 on strip #1 is saved in some storage means such as register 35. The comparison of the calculated and transmitted B3 values for F1, can thus be performed after the reading of the transmitted B3 value from F2.

In general, if a concatenated frame spans n strips on the same ASIC, the time length of the B3 propagation path, or the time when the B3 calculation is available at the first strip, is:

$$T_{B3}=(n-1)*\Delta t+(n-1)*\Delta t'=(n-1)*(\Delta t+\Delta t')$$

In the above embodiment, the calculation of B3 for F1 must be available at the first strip before the beginning, i.e.

the J1 byte, for the frame following F2, say F3. The available time for B3 to reach the first strip is thus $T_{B3}av$=length of frame. For SONET/SDH frames, the length of frame is 125 microseconds.

This reduces the number of strips on the same ASIC, available to carry a concatenated payload to n=$T_{B3}av/(\Delta t+\Delta t')+1$. In order to overcome such a limitation, a pipe of R registers for saving values of B3 on consecutive frames, rather than a single register for saving a single B3 value, may be implemented, as one skilled in the art would easily appreciate. In such a case, the time available becomes $T_{B3}av(R) \cong R$ *length of frame, and the number of strips, on the same ASIC, that can be used is: n=R *length of frame/$(\Delta t+\Delta t')+1$. Since R is unrestricted, n becomes restricted only by the number of strips that can be fitted on the same ASIC.

Figure 7:
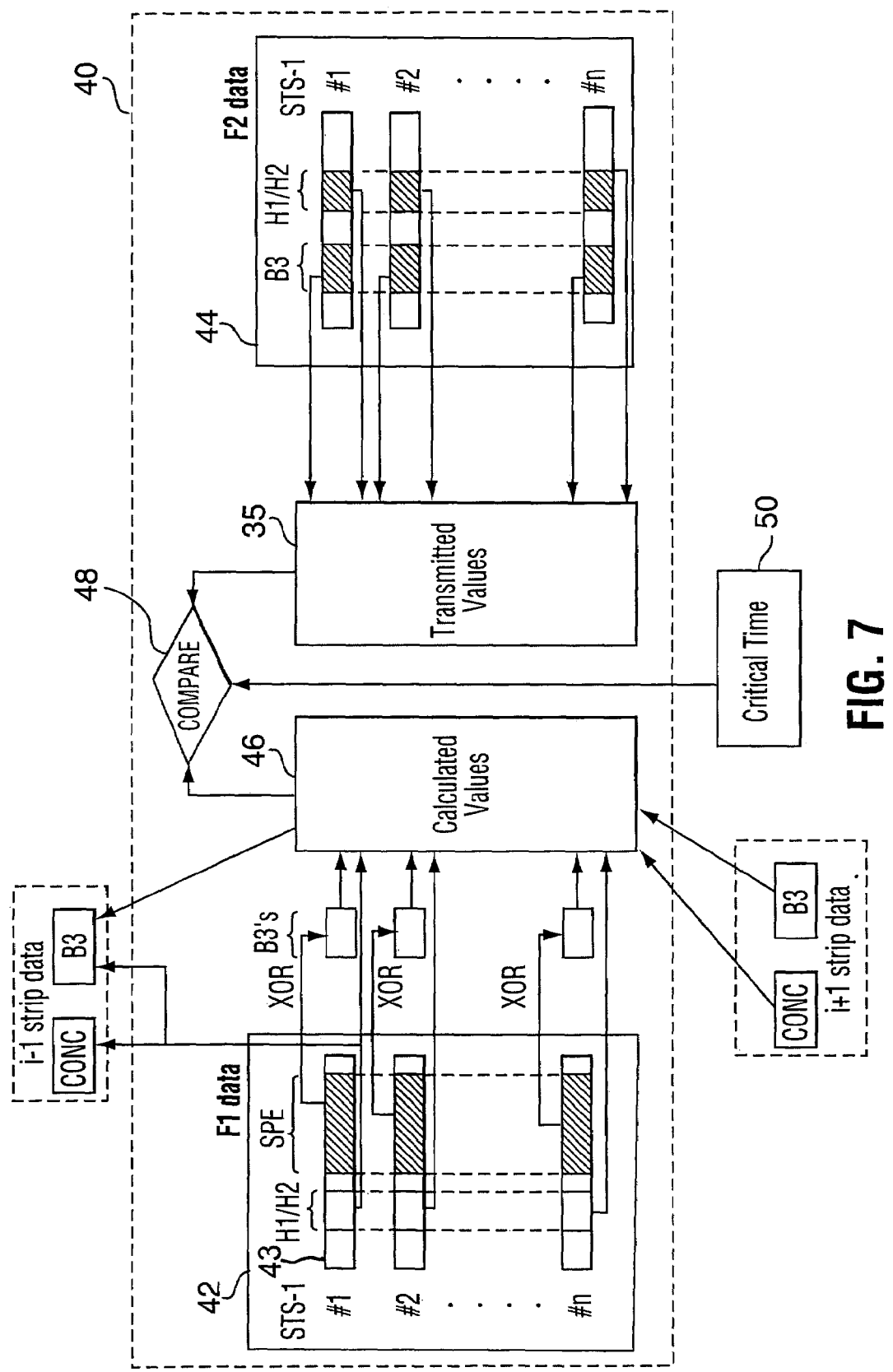
FIG. 7 illustrates a block diagram of a B3 computation system according to another embodiment of the present invention.

FIG. 7 illustrates by way of example a functional block diagram of a system for computing a frame error check value 40, in accordance with an aspect of the present invention. In the example in FIG. 7, the frame error check value is a BIP-8 value. Extending the concepts illustrated in this example to other frame error check values will be easily appreciated by those skilled in the art.

The BIP-8 computation system operates on the $i^{th}$ pointer processing strip 14 from an array of pointer processing strips 14, such as in FIG. 5, for example. Accordingly, the system processes the $i^{th}$ data slice from a possibly larger frame structure. The data processed on the $i^{th}$ strip is part of consecutive incoming frames, such as a first frame F1 and a second frame F2. To detect errors based on BIP-8 values, locally computed BIP-8 values for F1 must be compared with a transmitted BIP-8 values for F1, which arrives within F2 data. For simplicity, the system illustrates an F1 data block 42 and an F2 data block 44 as separate entities, although F1 data and F2 data arrive within a single physical entity. Each data block comprises n STS-1 data blocks, where n is the STS capacity level of the processing strip comprising the BIP-8 computation system 40. The computed BIP-8 values for F1 are calculated within a computed values block 46, based on F1 data inputs. The transmitted BIP-8 values for F1 arrives within the next frame, F2, therefore in the F2 data block 44, and are inputted for storage in an transmitted values storage block 35, corresponding to the register 35 in FIG. 6. The transmitted BIP-8 values are stored for delaying the comparison with the computed values, preferably until the computation of this later value(s) is completed in time. The computed values and the transmitted values are compare by a COMPARE block 48, at the indication of critical time signal, sent by a critical time block 50.

The critical time block usually signals the time of arrival of a new frame, for which no storage means 35 for the corresponding transmitted BIP-8 values would be available. For example, in the case of checking B3 byte data, if storage means are provided only for storing the B3 value on F2, the critical time block will trigger the comparison before the arrival of the J1 byte for a third frame F3. As mentioned previously in reference with FIG. 6, the delay available from the reading of the transmitted frame error check value(s) such as B3, until the comparison with the corresponding calculated value(s) can be increased by implementing a pipe of storage registers for the transmitted value(s), with one set of registers corresponding to a frame.

For the B3 processing, in particular, the calculation of the B3 values for the $i^{th}$ data slice, implies computing contents for the n B3 blocks 43 for each STS-1 block in the F1 data block (42), by XOR-ing the SPE bytes in each STS-1 block.

The n B3 values are further combined in the calculated B3 values for the calculated values block 46, based on the concatenation state of each of the STS-1 block, as indicated within the H1/H2 bytes of each of these blocks, as well as based on information incoming from the i+1 strip or data slice. The number of B3 calculated values corresponds to the number of valid pointers (VPTR) contained in the H1/H2 bytes of the STS-1 blocks.

The B3 values transmitted within the F2 data block, for F1, are stored only for the STS-1 blocks comprising valid pointer (VPTR) within their H1/H2 bytes, as only those B3 values need comparison. The number as well as the values of the calculated and transmitted B3 values must match; otherwise an error indication is generated.

If the data processed on the $i^{th}$ strip is part of a concatenation starting in an earlier strip, this information is contained in the H1/H2 byte, which, in such case, contains a concatenation indicator. Furthermore, in such case, the calculated B3 value for the data on strip i that is part of a concatenation carried on both strip i and strip i−1 is transmitted from the calculated value(s) block to a B3 block on strip i−1. A preferred implementation is to transmit:

a) when the STS-1 block in the F1 data block contains a concatenation indicator in its H1/H2 byte, a positive concatenation signal to the CONC block on strip i−1, and the B3 calculated value corresponding to the STS-1 #1 on the strip to the B3 block on strip i−1;

b) when the STS-1 block in the F1 data block contains a VPTR in its H1/H2 byte, a negative concatenation signal to the CONC block on strip i−1 and B3=00 to the B3 block on strip i−1;

Strip i receives similar signals from CONC block and the B3 block on the i+1 strip, as it sends itself to the CONC block and the B3 block on the i−1 strip. Therefore, all pointer processing strips 14 in an array can be identical with respect to the BIP-8 computation function, which advantageously simplifies the design of the pointer processor machine 10.

Across-chips Communication Techniques

Figure 8:
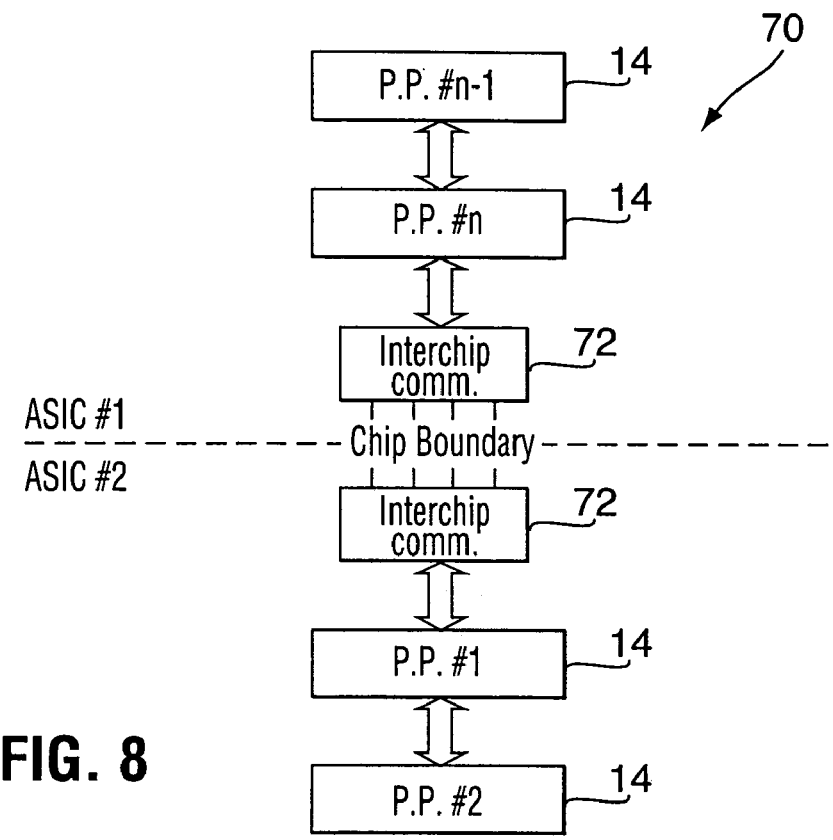
FIG. 8 illustrates a block diagram of an across-chip communication system according to another embodiment of the present invention.

FIG. 8 illustrates an across-chip communication system 70 for communication of information across-chip, along an array of pointer processing strips of a pointer processor. Information along pointer processing strips located on the same ASIC may be carried using the system and methods described above, in reference with FIGS. 3 to 8. In accordance with another aspect of the present invention, the across-chip communication system 70 comprises at least two inter-chip communication blocks 72, with one inter-chip communication block 72 located on each side of a chip boundary. Data travels along the array pointer processing strips 14 in an upward and downward fashion, from one strip 14 to the adjacent ones, for strips located on the same ASIC, or from a strip 14 to the inter-chip communication block 72 on the same ASIC as the strip 14, for strips 14 located near the chip boundary.

Downward Propagation of Pointer Information

On a pointer processing strip, a critical region for passing pointer information can be defined as the time region the processing of the H2 byte of the last STS-3 leader on the strip, e.g. the $10^{th}$ STS-1 block for an STS-12 level strip, and the processing of the first H3 byte, i.e. the H3 byte of the first STS-1 block on the strip, within the same frame.

Accordingly, the pointer information that must be communicated across slices spanning a concatenated frame can be divided into non-critical information, which can be passed away from a critical region, and critical information, which can only be determined and therefore further communicated to another strip, within the critical region. The non-critical pointer information comprises data such as pointer value, Elastic Store Write Address (ES_Waddr), Elastic Store Read Address (ES_Raddr) and so on. However, a characteristic of the non-critical information values is that their value during the critical region can be inferred from their value at any other point in the frame, provided the offset of that other point from the critical region is known.

The critical information comprises p-stuff and n-stuff indications, and the like. Critical information signals can only be determined, on a strip, during the critical region.

Figure 9:
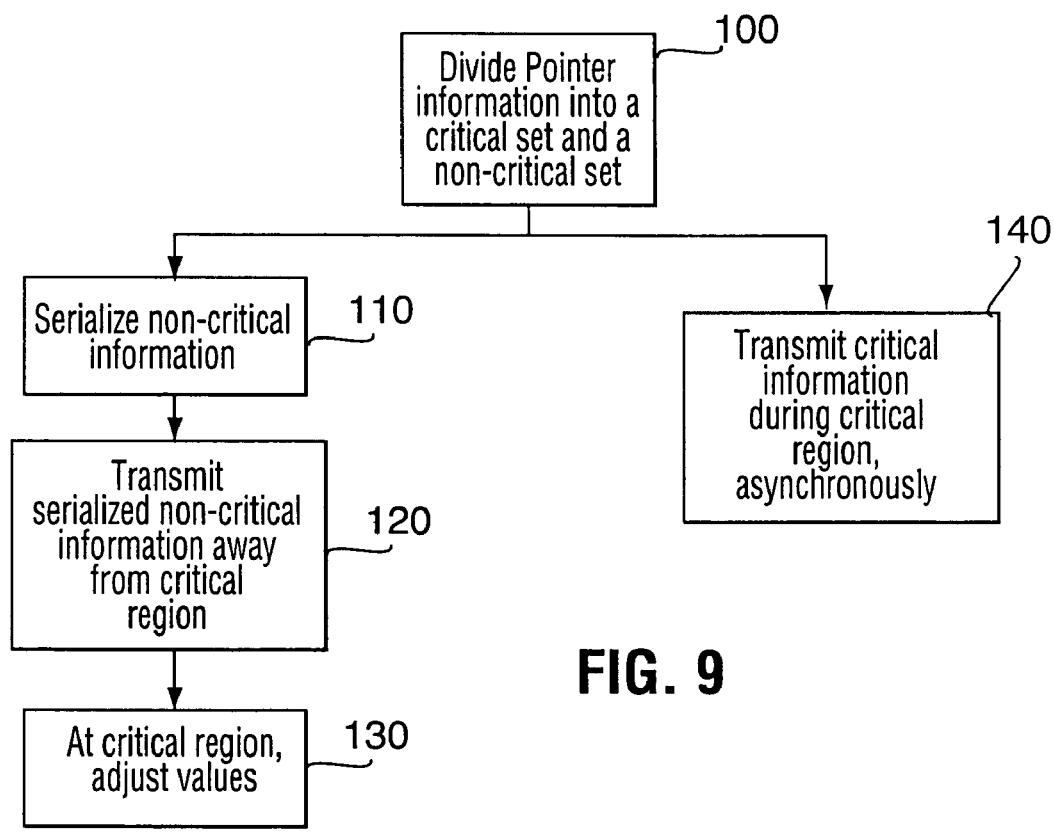
FIG. 9 illustrates a flow chart of a method of communicating information across chip according to another embodiment of the present invention.

FIG. 9 illustrates a flow chart for a method of passing pointer information across a chip boundary, from one pointer processing strip to another. The method comprises an initial step 100 of dividing the pointer information into a critical set and a non-critical set, according to the defined critical region. Following, the method comprises the step 110 of serializing data buses comprising non-critical information, followed by the step 120 of passing the serialized non-critical data synchronously, away from the critical region. The passing of information away from the critical region implies that data transfer occurs before the time occurrence of the critical region. In addition, the non-critical data which is passed synchronously, should preferably be passed at low frequencies, in order to guard against circuit board delays and thus ensure reliability of transmission. During the critical region, two operations are performed. At step 130, the received non-critical information is adjusted to correspond to the time of critical region. At step 140, the critical data is passed asynchronously in single bit buses.

For example, the transmission of the Elastic Store Write address (ES_Waddr), a non-critical signal, from processing strip i to processing strip i+1, across a chip boundary, occurs as follows within a preferred embodiment:

a) During the A1 byte time slot, the ES_Waddr is sampled on strip i;

b) The sampled value, which is 6 bits wide, is serialized, and transmitted across the chip boundary, to strip i+1, through the inter-chip communication line designated to passing ES_Waddr;

c) On strip i+1, the received ES_Waddr is adjusted as follows:

New ES_Waddr=[Received ES_Waddr+4×87] mod ES size, where ES is the Elastic Store size. The 4×87 offset factor is due to the fact that there are 4×87 SPE bytes between the A1 byte and the beginning of the critical region.

Non-critical information comprises single bit buses, such as AIS indication, as well as all multiple bit buses, such as Elastic Store Write address. According to a preferred embodiment, the passing of multiple bit buses is done serially at a low frequency, in order to increase reliability of the communication. Critical information comprises only single bit buses. Within the preferred embodiment, single bit buses, both critical and non-critical, are passed asynchronously from ASIC to ASIC.

Upward Propagation of Frame Error Check Data

The process of upward propagation of information is described, by way of example, with reference to the process of propagating B3 data. The B3 signals require information regarding the beginning of the SPE. As such, B3 values are transmitted only during the payload and their transmission time from chip to chip varies with respect to where the chip is located in a string of chips. Thus, if there are N chips, the B3 from the chip N to the N−1 will happen at a time Δt after J1, from N to N−1 the transmission will take place at Δt+Δt' to account for propagation delay of B3 through N−1 chip, and so on.

Numerous modifications, variations and adaptations may be made to the particular embodiments of the invention described in the documents attached herein, without departing from the scope of the invention, which is defined in the claims.

The embodiments of the invention in which an exclusive property or privilege is claimed are defined as follows:

1. A data processing system comprising:
   an input port for receiving input data; said input data comprising overhead control data and payload data;
   a parallel array of data processing strips, said strip processing a slice of the payload data by using the overhead control data;
   means for distributing input data from the input port to the data processing strips according to a distribution order;
   an overhead control data delay block controlling input data reading on at least a pair of an $i^{th}$ and a $j^{th}$ data processing strips, such that corresponding input data is read on the $j^{th}$ data processing strip after a predetermined delay from a time moment when corresponding input data is read on the $i^{th}$ data processing strip, wherein i and j are integers assigned to the data processing strips according to the distribution order and j is greater than i;
   means for collecting output data from the data processing strips according to a collection order; and
   an output port for transmitting output data.

2. A data processing system comprising:
   an input port for receiving input data; said input data comprising overhead control data and payload data;
   a parallel array of data processing strips, said strip producing a new overhead control data by processing a slice of the payload data;
   means for distributing input data from the input port to the data processing strips according to a distribution order;
   means for transfer the new overhead control data from an $i^{th}$ data processing strip to a $j^{th}$ data processing strip, wherein i and j are integers assigned to the data processing strips according to the distribution order and j is greater than i;
   means for collecting output data from the data processing strips according to a collection order; and
   an output port for transmitting output data.

3. The data processing system according to claim 2, wherein the new overhead control data from the $i^{th}$ data processing strip is incorporated into the processing of payload data on the $j^{th}$ data processing strip.

4. The data processing system according to claim 3, further comprising:
   storage means for storing an old first frame overhead control data, wherein the old first frame overhead control data is transmitted within the second frame;
   a critical time signalling circuit; and
   a comparator circuit, controlled by the critical time signalling circuit, for comparing the new overhead control data supplied by the data processing strip, with the old overhead control data supplied by the storage means,
   wherein the critical time signalling circuit sends an enabling signal to the comparator, for enabling the comparison operation according to a predetermined comparison timing schedule.

5. In a digital optical network, a method of verifying an overhead value of a transmission frame processed at nodes of the network, the method comprising:
   a) receiving input data; said input data comprising overhead control data and payload data;

b) distributing input data from the input port to a parallel array of data processing strips according to a distribution order;

c) producing a new overhead control data by processing a slice of the payload data on one of the parallel array of data processing strips;

d) transferring the new overhead control data from an $i^{th}$ data processing strip to a $j^{th}$ data processing strip, wherein i and j are integers assigned to the data processing strips according to the distribution order and j is greater than i;

e) collecting output data from the data processing strips according to a collection order; and f) transmitting output data.

6. The method according to claim 5, wherein producing a new overhead control data incorporates the overhead data from a second strip.

7. The method according to claim 5, further comprising the steps of:

storing an old first frame overhead control data, wherein the old first frame overhead control data is transmitted within the second frame;

enabling a comparison operation according to a predetermined comparison timing schedule; and comparing the new overhead control data, with the stored old first frame overhead control data.

8. In a digital optical network, a method of overhead processing on a concatenated payload, the method comprising:

i) distributing the concatenated payload into a string of data slices according to a distribution order;

ii) determining an across-chip pair of data slices within said string, wherein the across-chip pair comprises data slices requiring overhead processing on separate integrated circuits; and iii) transmitting overhead information from a first data slice in the across-chip pair to a second data slice in the across-chip pair by:

a) dividing the overhead information into a non-critical set and a critical set;

b) transmitting the non-critical set of overhead information away from a critical region, serially; and c) transmitting the critical set of overhead information within the critical region, asynchronously.

* * * * *